United States Patent [19]
Goppel et al.

[11] 3,915,783
[45] Oct. 28, 1975

[54] MAKING A THERMOSETTING RESIN IMPREGNATING LAMINATE

[75] Inventors: Johan M. Goppel; Peter R. Chant, both of Delft, Netherlands

[73] Assignee: Shell Oil Company, Houston, Tex.

[22] Filed: June 4, 1973

[21] Appl. No.: 366,381

Related U.S. Application Data

[63] Continuation-in-part of Ser. No. 208,937, Dec. 16, 1971, abandoned.

[30] Foreign Application Priority Data

June 26, 1970 United Kingdom............... 31101/70
June 17, 1971 Belgium .................................. 3168

[52] U.S. Cl. ................ 156/313; 156/245; 427/429; 428/298; 428/417
[51] Int. Cl.²............................................. C09J 7/00
[58] Field of Search ............ 161/36, 37, 43, 88, 93, 161/112, 159, 160, 161, 146, 184, 190; 156/48, 242, 330, 299, 312, 313, 77; 117/27, 115, 102, 120

[56] References Cited

UNITED STATES PATENTS

| | | | |
|---|---|---|---|
| 3,193,435 | 7/1965 | Schafer............................ | 161/159 X |
| 3,709,966 | 1/1973 | Gambardella................... | 161/159 X |
| 3,726,708 | 4/1973 | Weissenfels..................... | 161/159 X |

FOREIGN PATENTS OR APPLICATIONS

| | | |
|---|---|---|
| 1,209,974 | 10/1970 | United Kingdom |
| 1,068,503 | 5/1967 | United Kingdom |

*Primary Examiner*—George F. Lesmes
*Assistant Examiner*—Patricia C. Ives
*Attorney, Agent, or Firm*—Norris E. Faringer

[57] ABSTRACT

The present invention provides a process for making a thermosetting resin article which comprises (a) impregnating a compressible open-cell sheet with a thermosetting resin (b) applying a fibrous layer to at least one side of the sheet, (c) allowing the assembly to cure. The invention further is directed to thermosetting articles made by this process.

8 Claims, No Drawings

MAKING A THERMOSETTING RESIN IMPREGNATING LAMINATE

This application is a continuation-in-part application of Ser. No. 308,937, filed Dec. 16, 1971 now abandoned. Background of the Invention Field of the Invention This invention relates to a method of producing an article of thermosetting resin and to a novel thermosetting aricle.

Prior Art.

It is generally known in the laminating art that a laminated article can be prepared by several methods. (1). In one method, a core of the desired shape and density is pre-cut to the proper size and a reinforcing layer, often a resin-reinforced glass layer, is then glued on the core using the proper adhesive. If necessary, the assembly is then placed in a mold and cured. (2). Another method, often referred to as the "hand easy-up" method, involves producing an article in or on a mold. This method includes coating the molding surface with a release agent, laying a fibrous reinforcing material, for example, a layer of glass fiber, on the molding surface, impregnating the fibrous layer with an uncured, liquid thermosetting resin, and allowing the resin to cure and harden. The liquid resin is conventionally applied by hadn. (3). In still another method, particularly useful in the ski industry (see Article concerning "K-2" skis in the Seattle Times, Jan. 31, 1971), the core is pre-cut and a resin impregnated glass fiber mass is then wrapped around the core, the assembly is placed in the mold and heated and pressured so that the resin properly cures. In this case, the resin acts not only as an adhesive agent, but also the resin laminate combination envelopes the entire core.

Disadvantages of the first and third methods is that the core must be pre-cut exactly to fit the mold which is a time-consuming step, especially when working with difficult shapes such as skis. In the hand easyup method, the manual application of the resin is time-consuming and costly; moreover, the quality of the impregnated product is not the same over different areas thereof as a result of non-uniform impregnation with the resin.

It is generally known in the art that a foam sheet can be mildly impregnated with a thermosetting resin, partially compressed, and the resin allowed to cure in order to form a relatively strong, rigid article. Further, other materials, such as metals, wood, synthetic plastic material, or textile materials, can be used to face the resin impregnated foam article either before or after molding the foam (see Great Britain Pat. No. 911,427, issued Nov. 28, 1962). It is also known that a thermosetting resin reinforced with a glass fiber mat (described above) can be laminated to a thermosetting resin impregnated polyurethane foam, the foam being employed to improve the surface appearance of the final article (see Great Britain Pat. No. 1,068,503, issued May 10, 1967). In these methods, it is necessary to form the facing material separate from the impregnated foam and laminate the two thereafter.

It has also been suggested in British Pat. No. 1,209,974 to Konig, published Oct. 28, 1970, that an article is formed by mixing compressible filler particles of foamed material with fibrous reinforcing material and a synthetic resin, then laying a fibrous reinforcing material on the mixture, and compressing the assembly to distribute the resin throughout the core and fibrous layer. However, this method requires that fibers be distributed in the core to get the desired results.

SUMMARY OF THE INVENTION

This invention introduces an entirely new concept into the art of preparing thermosetting resin articles, in particular laminated articles, in order to overcome many of the difficulties experienced in the prior art. The basis of the invention is the utilization of a compressible open-cell sheet as a carrier for a thermosetting resin so that a fibrous reinforcing layer is controllably impregnated with the resin.

Accordingly, the invention provides a method of producing an article of thermosetting resin which comprises:

a. impregnating a flexible, compressible sheet having an open-cell structure with a curable thermosetting resin, b. applying a layer of fibrous reinforcing material to at least one side of the impregnated sheet, c. compressing the sheet and reinforcing layer to the extent that any voids remaining in the sheet after its impregnation with the resin are eliminated and resin is expelled from the sheet into the fibrous reinforcing layer so as to impregnate this layer with resin through its thickness, and d. allowing the resin in the sheet and layer to cure while maintaining the compression.

Further, this invention provides a thermosetting resin article comprising:

1. a thermosetting resin, 2. at least one fibrous layer which is uniformly impregnated with the thermosetting resin, and 3. a dense, visually solid layer substantially without voids, which is prepared by compressing to less than 30% of its original thickness, a flexible, compressible, open-cell structured layer, in which at least 25% of the open-cell space has been impregnated with the thermosetting resin, the impregnated fibrous layer being bound to the dense solid layer through the cohesive and adhesive action of the thermoset resin.

The invention is particularly suitable for making large objects in a relatively short time, for example, for making hulls of boats, since it permits large areas of the fibrous reinforcing material to be impregnated at once, but also can be easily adapted to the preparation of small articles such as skis or tennis racket frames or handles.

The invention exhibits many advantages in both the process and the product as compared to the more traditional processes of manufacturing mentioned above.

Processing advantages of the present invention include the following among others:

1. Low molding pressures — conventionally less than 10 kg/cm$^2$ and usually about 1 kg/cm$^2$ — so that even when two-part molds are employed, the mold, press and appurtenant apparatus investment costs are low.

2. Simplicity and convenience of working with easily handled materials of construction.

3. Only one layer of any laminate — the reservoir — has to be impregnated before lay-up in the press or die.

4. Easy lay-up even in complex molds since the compressible foam reservoir readily follows the mold contour.

5. Elimination of the need to lay-up additional material in places where increased stiffness or thickness is desired.
6. Cleaner, simpler and less labor dependent than laminate manufacture by hand lay-up, spray lay-up or vacuum/pressure bag molding so that ultimate product quality is considerably less dependent on operator skill.

Product advantages briefly include:
1. A wide range of performance characteristics is obtainable so that design requirements can be met accurately and economically.
2. Stiffness and thickness are located precisely when required and optimum use can be made of the reinforcement. Thus, a distinctive feature is that the quantity of reinforcement and the thickness of the laminate are variable independently of each other since the thickness of the laminate can be altered within wide limits by changing the thickness of the compressed foam core, keeping the reinforcement constant. Alternatively, the type and quantity of reinforcement can be changed without changing composite thickness.
3. Specific quantities are low, producing high stiffness to weight ratios.

DESCRIPTION OF THE PREFERRED EMBODIMENTS

The thermosetting resins suitable for use in this process includes phenolics, melamines, polyesters, epoxies and silicones. Generally, it is found that polyester and epoxy resins are eminently suitable in this particular process and for this reason are preferred. The thermosetting resins are converted to the thermoset form by cross-linking processes usually accomplished by the addition of a curing agent, with or without one or more curing catalysts or accelerators, to the resin. Proper curing agent for epoxy and polyester resins are well known to those skilled in the art. See, for example, chapters 5–12 of the *Handbook of Epoxy Resins*, Lee and Neville, McGraw Hill, Inc. 1967, for curing agents and mechanisms of cure for epoxy resins and chapter 6 of *Rineholt Plastic Application Series, polyester resins*, Lawrence, Rinehold Publishing Corp., 1967 for curing agents and mechanisms of cure for polyester resins. The resins will be in the liquid form so that the open-cell sheet can be properly impregnated. Of the epoxy resins, particularly preferred are the liquid glycidyl polyethers of polyhydric phenols, such as the diglycidyl ether of bisphenol A (BPA) made by reacting epichlorohydrin and BPA in the presence of caustic and generally having a molecular weight of about 350 to 400 and an epoxide equivalent of about 180 to 200. The preferred polyesters are the unsaturated polyesters generally known to be used in the laminating art.

The fibrous reinforcing layer used in the process of this invention can be one of many of the reinforcing layers known in the art such as cellulosic paper; cotton fabric; asbestos paper and fabric; nylon fabric; glass paper, mat or fabric; and metal filaments. The particular choice of reinforcing material, of course, will depend on the degree of stiffness required for the finished article. Particularly useful is glass and asbestos; reinforcing with glass paper, mat or fabric being preferred. Instead of only one fibrous layer, two such layers may be applied to the foam sheet, one on each side thereof. The foam sheet should then contain sufficient resin and be sufficiently compressed to impregnate both fibrous layers adequately. It is also possible to form the article from an assembly comprising two or more impregnated foam sheets alternating with fibrous layers.

The sheet having open-cell structure acts as the reservoir for the resin as well as the foam core for the finished thermosetting resin article. This sheet or layer can be referred to as the reservoir sheet. Generally, the sheet having the open-cell structure should be highly compressible, flexible, readily wettable by the liquid resin, and must possess an open connected cellular structure to allow essentially unobstructed passage of the liquid resin throughout the sheet. Sheets which are particularly useful in this regard include sheets of batting of natural or synthetic materials as long as the material does not react with the thermosetting resin which is used to impregnate the sheet, thus cotton batting is usable in this particular process. However, it is preferable to use a foam sheet which has an open-cell structure which is suitably made of a thermoplastic material, polyurethane, or elastomer. Polyurethane is particularly useful in this regard.

A sheet of flexible foam material can be immersed in a bath containing the liquid resin and be compressed in the bath by passage between compression rolls to drive out air from the cellular space of the foam thereby allowing the resin to fill the cellular space. If desired, the soaked sheet after leaving the bath may be passed between another set of rolls to reduce the volume of resin held by the sheet. However, it is generally desirable that the sheet is impregnated with resin, so as to fill at least 25% of the open cell space of the uncompressed sheet, and suitably about 35% or more. A particularly useful method of impregnation involves supplying foam sheet from two oppositely disposed supply sources, converting the two foam sheets supplied between a set of compression rolls so that the sheets are compressed to the desired degree, and supplying the liquid resin at the point of conveyance along the width of the sheets where the foam sheets contact so that the resin is soaked up by the expansion of the foam sheets after leaving the compression rolls. By this method a reservoir sheet of resin is formed wherein the outer face of the sheet is drier than the immersion impregnated foam sheets and thus easier to handle.

It is sometimes advantageous to partially cure the resin in the impregnated sheet to the "B-stage" then wind the B-Staged impregnated sheet on a roll for storage. This also aids in the handling of the reservoir sheet.

After the foam sheet has been impregnated to the desired degree, a layer of fibrous reinforcing material is applied to a side of the sheet. In practice, the assembly formed by the foam sheet and fibrous layer may be prepared outside of a mold and then be transferred to the mold and placed in contact with the molding surface. Alternatively, the fibrous layer is first laid on the molding surface, and the impregnated foam sheet is then applied to the fibrous layer. In both cases, it may be found desirable to allow the resin in the foam sheet to cure partly before the sheet is placed in the mold. If the resin is partly cured, for example, to the B-stage, the increased viscosity of the resin makes the sheet easier to handle. The B-stage is an early stage of cure before all the molecules are cross-linked where the resin exists as a thermoplastic which is hard but frangible and soluble in solvents such as acetone.

The next step is the application or pressure to the assembly, as, for example, by pressing another molding surface against the assembly. The pressure should be sufficient to compress the foam sheet to the extent that any open spaces in the impregnated foam sheet are eliminated as far as possible and resin from the sheet is squeezed out from the sheet into the fibrous layer whereby this layer is thoroughly impregnated throughout its thickness. The degree of compression of the foam sheet depends on the volume of resin taken up by the sheet during impregnation and the volume of resin required to impregnate the fibrous layer. Generally, only very low pressures are needed, i.e., less than 10 $kg/cm^2$ or less and usually only about 1 $kg/cm^2$ is needed. usually it will be necessary to compress the foam sheet to 30% or less of its original thickness. While the pressure is maintained, the resin in the compressed assembly is allowed to cure and thereby to become hard, whereafter the pressure can be released and the article formed by the hardened assembly can be removed from the mold. It is to be noted that the compressed and hardened sheet in the article has no longer an opencell foam structure, but instead has turned into a dense and visually solid layer without voids, and accordingly, this layer is not comparable with resin-wetted foamed plastics materials which have been hardened without the application of compression.

The compression of the foam sheet and fibrous layer may be applied selectively over their surface so that the combined thickness of the compressed sheet and layer is not uniform. Accordingly, when using a foam sheet and a fibrous layer of originally uniform thickness, it is possible to form the article with indentations or elevations as may be desired for shaping or for strength.

The method of the invention will normally be practiced using a mold, which may have a straight, curved or profiled molding surface as required. However, if the article to be made is, for example, a rigid sheet or board, it is possible to continuously pass the impregnated foam sheet with fibrous layer between compression means which apply the required compression to the assembly wherein during the passage the resin is cured. The compression means can be formed by rolls or by two opposite endless belts or by an adjustable or fixed metal, preferably steel die. To ensure that the resin has hardened before the assembly leaves the compression means a fast-curing resin composition can be selected, and/or heat may be supplied to the resin, for example, by employing heated compression means to shorten the curing time.

Particularly useful in this regard is to use a pultrusion method wherein the compression is applied by passing foam sheet and reinforcing layer through a forming die, and during said passage the resin in the sheet and layer is allowed to cure. The forming die, preferably a slit-shaped die with a tapering entrance, serves simultaneously as a compression device for driving out resin from the foam sheet into the reinforcing layer and as a shaping device for forming the assembly composed of the foam sheet and reinforcing layer, into the shape of the desired article. This pultrusion method is particularly useful for making shapes with high unidirectional strengths such as flat and profile stock for building siding and facia, "I" and other beams, gutters and down spouts piping, fishing rods, golf clubs, arrow shafts and the like. One advantage to this method is that it is continuous; consequently, the need for molds being periodically opened and closed is eliminated.

By using a tapered entrance for the die, the compression of the foam sheet can be effected in a gradual and controlled manner to ensure uniform and thorough impregnation of the reinforcing layer with resins. The foam sheet and reinforcing layer may be fed into the die in flat condition or in a curved shape, depending on requirements. The die may be designed so as to shape the compressed assembly in the form of a sheet, pipe, profiled beam or other article desired. To prevent drool at the entrance of the die or to increase the rate of production, the resin in the foam sheet can be partly cured to the B-stage before feeding the sheet into the die.

This aspect of the invention is, for example, carried out by covering a sheet of foamed, flexible, open-cell polyurethane impregnated with a thermosetting resin on both sides with a glass-fiber mat then passing the covered impregnated sheet through a forming die composed of lower and upper die sections (optionally with linings of tetrafluoroethylene) with a tapering entrance to allow the uncompressed covered sheet to easily enter. The sheet is gradually compressed as it passes through the entrance to a slit-shaped section having parallel flat walls. The die may be open-ended laterally. A traction device is provided at the exit of the die to pull the assembly through the die in a continuous movement. Electrical heaters or other heating devices are easily mounted in the forming die at one or both sides of the die and/or entrance. The upper and lower die sections may be adjustable relative to each other to adjust the spacing therebetween. The length of the die should be sufficient to ensure complete curing of the assembly before it leaves the die for the desired speed of operation and curing temperature.

To illustrate the manner in which the invention may be carried out, the following embodiments are given. it is to be understood, however, that these embodiments are for the purpose of illustration and the invention is not to be regarded as limited to any of the specific materials or conditions recited therein.

ILLUSTRATIVE EMBODIMENT I

A sheet of flexible foamed polyurethane with a thickness of 10 mm was soaked in an epoxy resin system and passed between rollers to squeeze out the excess of resin, so that about 2 kg resin remained in the sheet per $m^2$ surface area.

The impregnated sheet was B-staged for 75 seconds at 180°C.

A glass fiber mat was placed on one side of the sheet, the laminate assembly was placed in a hot mold (180°C) and pressure was applied for 80 seconds.

The final thickness of the laminate was 2–3 mm.

ILLUSTRATIVE EMBODIMENT II

A 20 mm thick sheet of open-celled flexible polyurethane foam was impregnated with liquid epoxy resin by passage through a bath containing the resin. In the bath, the sheet was compressed followed by expansion to soak it with the resin. On leaving the bath, the sheet was passed through a pair of squeeze rollers to expel excess resin. After this operation, the sheet contained 1.2 kg of resin per $m^2$ of surface area. The impregnated sheet was transported on a continuously moving conveyor belt through an oven maintained at 180°C, the residence time of the sheet in the oven being 75 seconds. At this moment, the resin in the foam had cured to the B-stage. A glass fiber mat was then placed on both sides of the sheet, and the assembly was fed into a forming die having a tapered entrance 1000 mm long and 25 mm wide at the widest point and having a parallel die section 200 mm long and 2 mm wide (both lengths measured parallel to the direction of movement of the assembly while both widths are normal to the direction of the sheet assembly).

The parallel section of the die was maintained at 180°C, and the assembly was pulled through the die with a speed of 30 cm/min. Thus the residence time was 40 seconds during which the resin in the assembly had cured completely and a 2 mm thick rigid laminate emerged from the die.

We claim as our invention:

1. A process for producing an article of thermosetting resin, comprising:
   a. impregnating a compressible sheet having an open-cell foam structure with a liquid heat-curable thermosetting resin,
   b. applying at least one layer of fibrous reinforcing material on both sides of the impregnated foam sheet,
   c. compressing the foam sheet and reinforcing layers to the extent that any voids remaining in the sheet after its impregnation with the resin are substantially eliminated and resin is expelled from the foamed sheet into the fibrous reinforcing layers impregnating said fibrous layers with resin throughout its thickness, and
   d. allowing the resin in the sheet and layers to cure to a unitary structure while maintaining the compression.

2. The process of claim 1 wherein after the reinforcing layers have been applied to the foam sheet, the resulting assembly is placed in contact with a molding surface, and the assembly is compressed against said molding surface.

3. The process of claim 1 wherein the resin in the foam sheet is allowed to cure partly before the sheet and layers are compressed.

4. The process of claim 1 wherein the impregnated foam sheet is compressed to 30% or less of its original thickness.

5. The process of claim 1 wherein the compression is applied selectively, so that the combined thickness of the compressed sheet and layers are not uniform over their surface.

6. The process of claim 1 wherein the foam sheet is impregnated with the resin, so that at least 25% of the open cell space of the sheet is filled.

7. The process of claim 1 wherein the compressing is done by continuously passing the impregnated foam sheet and fibrous layers between compression means during which passage the resin is cured.

8. The process of claim 7 wherein the compression means is a fixed metal die.

* * * * *